(12) United States Patent
Schautt et al.

(10) Patent No.: US 10,300,602 B2
(45) Date of Patent: May 28, 2019

(54) METHOD AND MEANS FOR HANDLING AN OBJECT

(71) Applicant: ABB gomtec GmbH, Seefeld (DE)

(72) Inventors: Martin Schautt, München (DE); Richard Roberts, Gilching (DE)

(73) Assignee: ABB SCHWEIZ AG, Baden (CH)

( * ) Notice: Subject to any disclaimer, the term of this patent is extended or adjusted under 35 U.S.C. 154(b) by 127 days.

(21) Appl. No.: 15/302,629

(22) PCT Filed: Apr. 7, 2015

(86) PCT No.: PCT/EP2015/000735
§ 371 (c)(1),
(2) Date: Oct. 7, 2016

(87) PCT Pub. No.: WO2015/154870
PCT Pub. Date: Oct. 15, 2015

(65) Prior Publication Data
US 2017/0129106 A1    May 11, 2017

(30) Foreign Application Priority Data
Apr. 7, 2014    (DE) .................. 10 2014 004 919

(51) Int. Cl.
  *B25J 9/16*    (2006.01)
  *G05B 19/423*  (2006.01)

(52) U.S. Cl.
  CPC .......... *B25J 9/1692* (2013.01); *G05B 19/423* (2013.01); *G05B 2219/36433* (2013.01); *G05B 2219/39398* (2013.01); *Y10S 901/41* (2013.01)

(58) Field of Classification Search
  CPC ............... B25J 9/1692; Y10S 901/41; G05B 2219/39398; G05B 2219/36433
  USPC ................................................ 700/245, 262
  See application file for complete search history.

(56) References Cited

U.S. PATENT DOCUMENTS

| 5,345,540 A | 9/1994 | Schleifer et al. |
| 8,095,237 B2 * | 1/2012 | Habibi .................. B25J 9/1692 |
| | | 700/245 |

(Continued)

FOREIGN PATENT DOCUMENTS

| CN | 10 2581852 | 7/2012 |
| DE | 3883109 | 3/1994 |

(Continued)

OTHER PUBLICATIONS

International Search Report for PCT Application PCT/EP2015/000735, dated Jul. 17, 2015,EPO.
Written Opinion of PCT/EPO2015/000735, dated Jul. 15, 2015, EPO.

*Primary Examiner* — Jaime Figueroa

(57) ABSTRACT

A method for handling an object comprises the steps:
a) connecting the object (1) with a manipulator (5) and with an input tool (7) by means of which a direction ($\vec{d}'$) within an internal coordinate system (K') relating to the input tool (7) can be entered,
d) initiating a test movement of the manipulator (5) on the basis of a direction ($\vec{r}$) known in the external coordinate system (K);
e) determining the direction ($\vec{r}'$) of a movement of the input tool (7) in the internal coordinate system (K') resulting from the test movement of the manipulator (5);
f) determining a coordinate transformation (T) which transforms the direction of the resulting movement ($\vec{r}'$) in the internal coordinate system into the known direction ($\vec{r}$) in the external coordinate system;
g) detecting an internal direction ($\vec{d}'$) within the internal coordinate system (K') entered by a user using the input tool (7);
h) applying the coordinate transformation (T) to the detected internal direction ($\vec{d}'$) in order to obtain an external direction ($\vec{d}$); and (Continued)

i) controlling a movement of the manipulator (5) on the basis of the external direction ($\vec{d}$).

17 Claims, 2 Drawing Sheets

(56) References Cited

U.S. PATENT DOCUMENTS

| | | | | |
|---|---|---|---|---|
| 2005/0151963 A1* | 7/2005 | Pulla | ............... | G01B 21/04 |
| | | | | 356/139.03 |
| 2006/0074527 A1* | 4/2006 | Bhatt | ............... | B25J 9/1658 |
| | | | | 700/251 |
| 2009/0036902 A1* | 2/2009 | DiMaio | ............... | A61B 8/12 |
| | | | | 606/130 |
| 2010/0145520 A1* | 6/2010 | Gerio | ............... | B25J 13/06 |
| | | | | 700/264 |
| 2010/0232683 A1* | 9/2010 | Fujieda | ............... | G06T 15/20 |
| | | | | 382/154 |

FOREIGN PATENT DOCUMENTS

| | | |
|---|---|---|
| DE | 10 200 9041946 | 3/2011 |
| EP | 1724072 | 11/2006 |
| EP | 1738881 | 1/2007 |
| EP | 1795315 | 6/2007 |
| EP | 2008778 | 12/2008 |
| EP | 2194434 | 6/2010 |
| JP | 2010269419 | 12/2010 |

* cited by examiner

METHOD AND MEANS FOR HANDLING AN OBJECT

The present invention relates to methods and means for handling an object, in particular a heavy, bulky or for other reasons unwieldy object, for example in a warehouse, a production plant or similar.

Known from CN 102 581 852 A is a method for handling an object in which an input tool is attached to an object which is held by, and is to be moved by, a manipulator, and a movement of the object is controlled by pulling or pushing an operating lever on the input tool. However, an intuitive control of movements of the object is only possible with this input tool if the input tool is mounted in such a way that the direction in which the operating lever is pulled or pushed corresponds with the direction of a movement of the object controlled in this way.

Known from DE 38 83 109 T2 is an object handling system in which an input tool has a cube-shaped body and a joystick projecting from one of the six surfaces of the cube. The input tool can be placed with any of the five other surfaces of the cube on a support and is equipped with an orientation sensor which enables it to identify which surface of the cube is facing downwards. When implementing an input entered by the user using the joystick, a control unit takes into consideration which of the five surfaces of the cube is at the bottom. If the input tool is set up with the joystick pointing upwards, in the z-direction, an actuation of the joystick is translated into a movement of the handled object in the x-y plane; if it lies on the side, so that the joystick can be deflected upwards or downwards, then a movement of the object in the z-direction is also controlled through this deflection. An intuitive operability is not ensured here either, since a rotation of the input tool around the z-axis cannot be detected, so that the direction of an actuation of the input tool by the user in a horizontal direction and the direction of the movement of the object initiated by the control unit in response can be random.

Known from DE 10 2009 041 946 A1 is an input device for the combined input of control and program commands for a manipulator. The input device comprises a manual control lever which can be moved along multiple axes relative to a base in order to input control commands and a multiple-axis finger input device for inputting program commands.

EP 1 738 881 B1 discloses a robotic control system comprising an input device with a control switch manipulated by the user. The input device has a 6-degrees-of-freedom magnetic sensor for detecting its position and attitude in order to control the robot accordingly.

U.S. Pat. No. 5,345,540 A discloses a method for programming a manipulator in order to move a manipulator from a point of origin to one or more modules.

The object of the present invention is to provide a method for handling an object in which a comfortable, intuitive controllability of movements of the object can be ensured at all times.

This problem is solved through a method comprising the steps:
a) mechanically connecting the object with a manipulator and with an input tool by means of which a direction can be entered within an internal coordinate system relating to the input tool,
b) initiating a test movement of the manipulator by a control unit on the basis of a direction known in an external coordinate system;
c) determining within the internal coordinate system the direction of a movement of the input tool resulting from the test movement of the manipulator;
d) determining a coordinate transformation which transforms the direction of the resulting movement in the internal coordinate system into the known direction in the external coordinate system;
e) detecting, within the internal coordinate system, an internal direction entered by a user using the input tool;
f) applying the coordinate transformation to the detected internal direction in order to obtain an external direction; and
g) controlling a movement of the manipulator on the basis of the external direction.

Since the input tool can be connected with the object and the manipulator in any desired orientation, the relation between external and internal coordinate system is initially unknown. However, since the direction of the test movement in the external coordinate system is already known and can be measured in the internal coordinate system, the relation between the coordinate systems can also be determined, and the direction entered by the user can be transformed into the external coordinate system such that the direction of the movement initiated by the control unit in response to the input by the user corresponds with the entered direction. In this way, the intuitive operability of the object handling system is guaranteed.

Because the input tool is connected with the manipulator and the object being handled by it, changes in the orientation of the input tool are only still possible if they are associated with a corresponding change in the orientation of the object and are consequently initiated by a control unit of the manipulator. Unlike the input tool known from DE 38 83 109 T2, such changes in orientation can be taken into consideration by the control unit through an updating of the coordinate transformation when the control unit moves the object on the basis of inputs by the user entered on the input tool, so that the correspondence between the direction of the input and the direction of the resulting movement of the object can also be maintained in the event of a change in the orientation of the input tool in space.

The test movement can be a translation. In order to detect its direction, the input tool can be equipped with an acceleration sensor by means of which the direction of an acceleration acting on the input tool at the beginning of the test movement or the direction of a deceleration at the end of the test movement can be detected.

According to a preferred alternative, the test movement is a rotation, and the known direction is the direction of the axis of this rotation. Such a rotation can also be detected with an acceleration sensor by detecting the direction of the gravitational acceleration within the internal coordinate system of the input tool before and after the rotation. The direction of the axis of the rotation can then be calculated without any problem, for example through formation of a cross product of the two detected gravitational acceleration vectors.

In order to allow the direction within the internal coordinate system to be determined as exactly as possible, the known direction should preferably be horizontal.

If the input tool comprises a base for connection with the object and a head which can be moved relative to the base from a neutral position, then the direction of a movement of the head can be detected as an internal direction entered by the user.

According to an alternative embodiment which does not require that the head be moveable relative to the base, the direction of a force or of a torque acting between the head and the base of the input tool can also be detected as the entered internal direction.

The known direction of the test movement can be predetermined and can be the same each time the method described above is carried out. This is in particular practical if the method is carried out each time the object handling system is started up or following connection of an input tool with the object and manipulator and no information is available as to the orientation in which the input tool is attached. Alternatively, it is also possible to carry out the following steps, additionally, between step a) and step d):
b) detecting an internal direction entered by the user using the input tool;
c) applying a predetermined coordinate transformation to the detected internal direction,
in order in this way to obtain a direction for the test movement which, while not necessarily being the same each time the method is carried out, can nonetheless be calculated on the basis of the predetermined coordinate transformation and is thus known.

Expediently, this predetermined coordinate transformation can in particular be a coordinate transformation determined in an earlier iteration of the method. This increases the probability that the direction of the test movement at least largely corresponds with the direction in which the user wishes to guide the object by his input, preventing the user from being irritated through a movement of the object in a direction not desired by him.

Also, these additional steps make it possible, in particular, to check continuously during the course of operation of the object handling system whether the applied coordinate transformation still matches the orientation of the input tool, and to adjust the coordinate transformation if necessary.

Expediently, a fault, for example due to a lack of physical connection between the input tool and the object which is to be handled, can be detected if a movement of the input tool is detected which is not caused through a movement of the manipulator or if no movement of the input tool is detected in response to a movement of the manipulator.

The subject matter of the invention is also an object handling system with a manipulator to which an object which is to be handled can be temporarily attached, an input tool which can be attached to the object and a control unit for controlling the manipulator on the basis of inputs entered by a user using the input tool, wherein the input tool has an orientation sensor for detection of the orientation of the input tool in space and is set up to communicate a detection result of the orientation sensor to the control unit.

The input tool can comprise a base for attachment to the object and a head designed to be manipulated by the user, whereby the head and the base are, expediently, physically connected via an input sensor which is set up to detect, in relation to an internal coordinate system of the input tool, at least one vectorial control parameter applied to the head by the user in order to input a direction.

The orientation sensor can be any type of sensor which makes it possible to measure an angle between a reference direction of the input instrument and an external preferred direction such as the direction of the gravitational acceleration or of the earth's magnetic field. In particular, the orientation sensor can be an acceleration sensor, the detection result of which quantitatively specifies at least the direction, possibly also the amount, of an acceleration acting on the input tool in relation to the internal coordinate system of the input tool. The better the resolution of this acceleration sensor, the smaller the amplitude of the test movement which is necessary for an adequately precise determination of the coordinate transformation. A small amplitude of the test movement is desirable in order to prevent the object from colliding with an external obstacle during the test movement. The angular resolution of the acceleration sensor should therefore, expediently, lie within the range of a few degrees or better.

In order not to limit the possibilities for the placement of the input tool on the object, the input tool and control unit should, expediently, be equipped with wireless interfaces for mutual communication.

The manipulator can be an end effector of a robot arm with articulated members; however, the invention is not limited to this, but can for example be applied to a manipulator which can be moved by means of an overhead crane or a crane trolley.

A further subject matter of the present invention is the input tool for the object handling system described above. Such an input tool can, expediently, include a switch which responds to the presence of a foreign body in a region of the environment surrounding the input tool. The status of such a switch is an indication of whether or not the input tool is attached to an object which is to be handled. It can be actuated mechanically, through contact with the object, or can function in a contact-free manner. Contact-free switches preferably include, in particular, an inductive switch, since this is capable of detecting objects largely irrespective of the materials of which they are composed.

Expediently, such a switch is arranged on the base of the input tool, and the region of the surrounding environment which it monitors is located on a side of the base facing away from the head.

By means of the switch, the input tool can be switched between an idle state in which the detection results of the orientation sensor and/or of the input sensor are not output and an active state in which the detection results are output. On the one hand, such a switching reduces the likelihood that detection results are supplied to the control unit while the input tool is not mounted on the object, and on the other hand it helps minimise the energy consumption of the input tool, which is in particular advantageous if the input tool draws its operating energy from an internal source such as a battery or an accumulator.

A further subject matter of the invention is a computer program product with program code means which enable a computer to carry out the method described above.

Further features and advantages of the invention are explained in the following description of exemplary embodiments with reference to the enclosed figures, in which.

Figure 1:
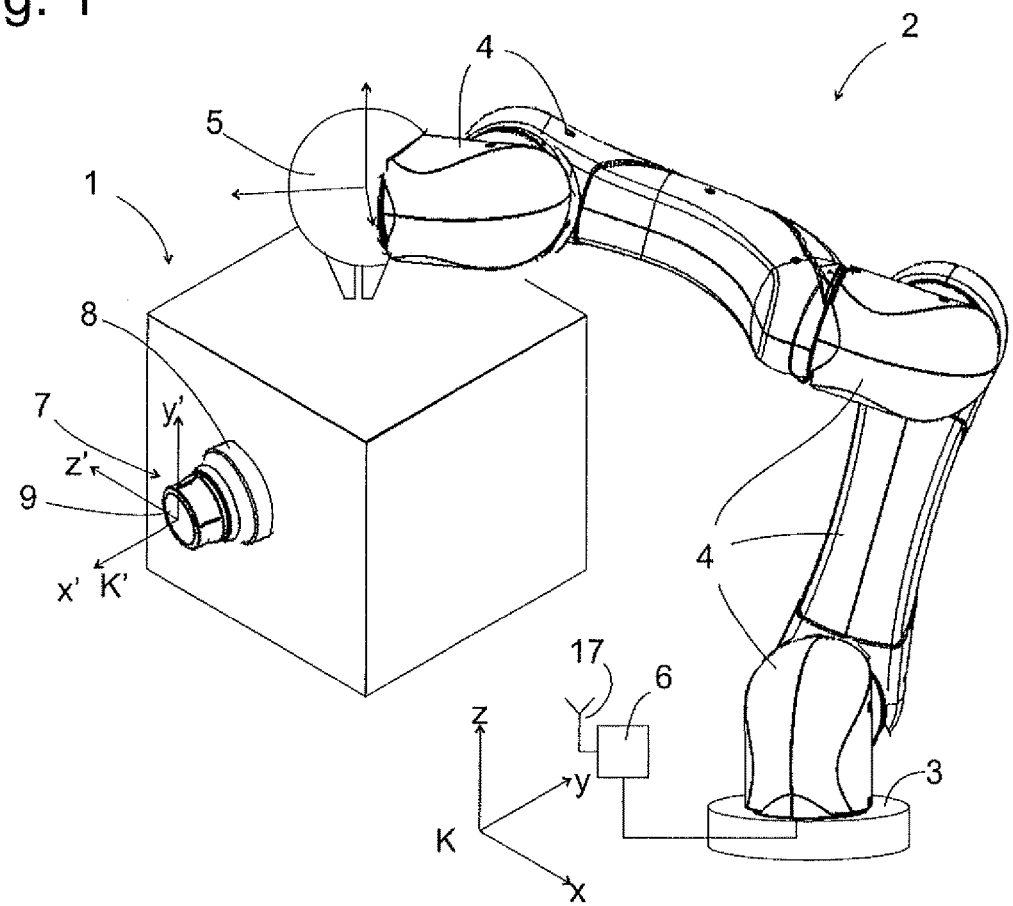
FIG. 1 shows a diagrammatic view of an object handling system according to the invention.

FIG. 1 shows a diagrammatic view of an object handling system for handling an object 1. The object 1 is represented here diagrammatically as a cube, but it is obvious that its form and material properties are in principle unlimited. A robot arm 2 comprises a base 3, fixed in position within a coordinate system referred to here as an external coordinate system, and a plurality of members 4, which form a chain between the base 3 and an end effector 5 holding the object 1 and which are connected with one another, with the base 3 or with the end effector 5 in an articulated manner. A control unit 6, typically a microcomputer, is connected with the robot arm 2 in order to control movements of the members 4 and of the end effector 5 within a coordinate system K—referred to here as an external coordinate system—with axes x, y, z, in which the base 3 of the robot arm 2 is immovable. In order to simplify the notation it is assumed in the following that the gravitation vector points in the direction of the negative z-axis.

An input tool 7 is temporarily attached to the object 1. The input tool 7 comprises a base 8, in this case of flat cylindrical form, one end face of which faces the object 1 and is attached to this and the other end face of which carries a head 9 which is manipulated by a user. The head 9 is in this case also of flat cylindrical form, and of somewhat smaller diameter than the base 8.

Figure 2:
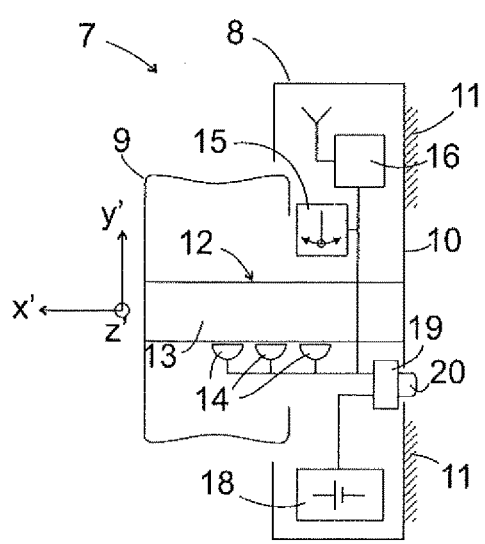
FIG. 2 shows a schematic section through an input tool of the object handling system.

FIG. 2 shows a schematic cross section through the input tool 7. Means for temporary attachment are provided on the end face 10 facing the object 1, in this case for example strips of double-sided adhesive tape 11, which only need to be pressed against a side of the object 1 in order to have the input tool 7 adhere thereto, and which can be replaced if they become dirty and are no longer sufficiently adhesive.

Depending on the nature of the object 1 which is to be handled, other means for temporary attachment can be practical. If for example the objects which are to be handled are wooden shipping crates, instead of the strips of adhesive tape 11 the end face 10 could also carry a plurality of spikes which bore into the wooden surface and provide support for the input tool 7 if it is pressed against the crate by a user. If the objects which are to be handled are containers or general objects made of ferromagnetic material, possible means for temporary attachment also include permanent magnets or electromagnets. If the objects which are to be handled are pallet cages, hooks can also be attached to the end face 10 in order to suspend the input tool from a wire on the wall of the pallet cage. Further variants are conceivable.

The head 9 of the control unit 6 shown in FIG. 2 is connected with the base 8 via a sensor 12 by means of which a vectorial control parameter applied to the head 9 by the user can be detected. Depending on the design of the connection, the head 9 can be more or less moveable relative to the base 8 (for example a joystick) or can also be wholly immovable (for example a pressure sensor).

The control parameter detected by the sensor 12 can in particular be a force or a torque. Intuitively, a tensile or pressing force which the user applies to the head 9 will be oriented in the direction in which he wishes to translate the object 1, or a torque applied by him is oriented in the direction of the axis around which he wishes to rotate the object 1. Depending on the construction type, the sensor 12 can be sensitive to force, to torque or to both. It preferably possesses three sensor components 14 for each sensed control parameter, each designed to detect one of three mutually orthogonal components of the relevant control parameter. These sensor components 14 can for example be optoelectronic sensors (PSDs), piezo elements or strain gauges arranged on a rod 13 connecting the head 9 with the base 8. The three spatial directions for which the three sensor components 14 are sensitive expediently form the axes of an internal coordinate system x', y', z' relative to the control unit 6 so that the trio of measured values supplied by the three sensor components 14 can be interpreted as a vector of the control parameter in a Cartesian representation relative to the internal coordinate system x', y', z'. For the sake of simplicity it can be assumed that the axis x' of this internal coordinate system runs in the longitudinal direction of the rod 13, the axis y' transversely thereto in the sectional plane in FIG. 2 and that the axis z' runs perpendicular to the sectional plane.

The base 8 also contains an acceleration sensor 15 for measuring a vectorial acceleration. Like the sensor 12, the acceleration sensor 15 can also comprise three sensor components which are in each case sensitive to accelerations in three orthogonal spatial directions, whereby, expediently, these spatial directions should also be the axial directions of the internal coordinate system x', y', z'.

A radio interface 16 is connected with the sensors 12, 15 in order to transmit their detection results to a complementary radio interface 17 of the control unit 6. A replaceable battery or an accumulator 18 mounted in the base 8 serves to supply the radio interface 16 and the sensors 12, 15 with operating energy.

In the embodiment shown in FIG. 2, a switch 19 is provided between the accumulator 18 and the sensors 12, 15 on the one hand and the radio interface 16 on the other which has a button 20 projecting beyond the end face 10 which can be actuated through contact with the object 1. The switch 19 is closed if the button 20 is pressed in. The sensors 12, 15 and the radio interface 16 are thus supplied with energy if the input tool 7 is mounted on the object 1 and the button 20 is forced back, and in this state supply detection results to the control unit 6. If the input tool 7 is detached from the object 1 and the button 20 is released, the switch 19 is open; no detection results are supplied and no energy is consumed.

Other types of switch 19 can be provided in order to detect the attachment of the input tool 7 on the object 1; for example a capacitive proximity switch, which detects the approach to an object 1 on the basis of a change in the dielectric constant in its vicinity. If the object 1 is ferromagnetic and the means for temporary attachment of the input tool 7 comprise a permanent magnet, then the switch 19 can also be formed by a coil surrounding the permanent magnet which reacts to a change in the magnetic flux as the permanent magnet approaches the object 1.

Figure 3:
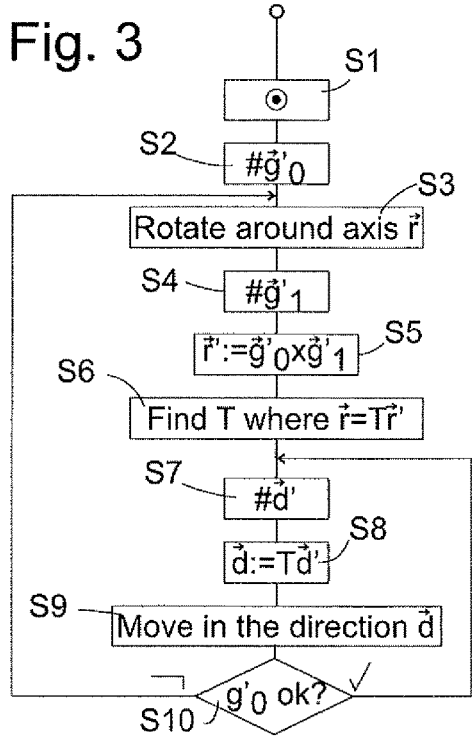
FIG. 3 shows a flow chart of a working method of the control unit from FIG. 1 according to a first embodiment.

FIG. 3 shows a flow chart of a working method of the control unit 6 according to a first embodiment. An activation step S1 can consist of the control unit 6 being switched on or beginning to receive data from the input tool 7 after this has been attached to the object 1.

The input tool 7 reacts to its attachment to the object 1 through transmission to the control unit 6 of the three components of the gravitational acceleration vector, relating to the internal coordinate system, detected by the acceleration sensor 15; these are received by the control unit 6 in step S2 and stored as vector $\vec{g}'_o$.

In step S3, the control unit 6 actuates the robot arm 2 in order to rotate the object 1 around an axis in a test movement. The direction of this axis is known to the control unit 6 and can be stated in the external coordinate system as vector $\vec{r}$ parallel to the axis (whereby no distinction is made in the following between the vector and the axis specified by said vector, and the symbol $\vec{r}$ is used for both.

The method is particularly simple if the axis $\vec{r}$ is chosen to be horizontal. In order to simplify the notation it can then be further assumed that the test movement is a rotation around the x-axis of the external coordinate system K, i.e. that $\underline{r}$ is a vector in x-direction.

This rotation results in a change in the direction of the gravitational acceleration within the internal coordinate system of the input tool 7; in S4 the changed gravitational acceleration vector is again received by the control unit 6 and stored as the vector $\vec{g}'_1$. The direction of the axis of rotation is stated in the internal coordinate system through $$\vec{r}' = \vec{g}'_o \times \vec{g}'_1$$

and is calculated in step S5.

The vectors $\vec{g}'_o$ and $\vec{g}'_1$ span a plane within the internal coordinate system in which all of the gravitational acceleration vectors occurring during the course of the rotation lie and to which the cross product $\vec{r}' = \vec{g}'_o \times \vec{g}'_1$ stands perpendicular. If the axis $\vec{r}$ is not horizontal, then instead the gravitational acceleration vectors define a cone around the axis of rotation, and the cross products of gravitational acceleration vectors measured at different times have different directions which do not correspond with the direction of the axis, so that in this case the above formula does not apply. Since gravitational acceleration vectors $\vec{g}'_o$, $\vec{g}'_{0.5}$ and $\vec{g}'_1$ measured at the beginning, during and at the end of the rotation all have the same amount, their differences are however perpendicular to the axis of rotation, so that in this case the direction of the axis of rotation within the internal coordinate system can be obtained through $$\vec{r}' = (\vec{g}'_o - \vec{g}'_{0.5}) \times (\vec{g}'_{0.5} - \vec{g}'_1)$$
$$= \vec{g}'_o \times \vec{g}'_{0.5} + \vec{g}'_{0.5} \times \vec{g}'_1 \times \vec{g}'_1 \times \vec{g}'_o$$

Thus, at the end of the rotation the normalised acceleration vector $\|-\vec{g}'_1\|$ within the internal coordinate system K' corresponds to the z-unit vector in the external coordinate system K, $\|\vec{r}'\|$ corresponds to the x-unit vector and $\|-\vec{g}'_1 \times \vec{r}'\|$ corresponds to the y-unit vector.

In the next step S6, the control unit 6 determines the coordinate transformation (rotation matrix) $T_1$ which transforms the internal coordinate system K' into the external coordinate system K. The rotation matrix consists of the components of the unit vectors of K', i.e. if the vectors have the following components in Cartesian representation within the internal coordinate system K'

$$\|\vec{r}'\| = \begin{pmatrix} x'_1 \\ x'_2 \\ x'_3 \end{pmatrix}, \|-\vec{g}'_1 \times \vec{r}'\| = \begin{pmatrix} y'_1 \\ y'_2 \\ y'_3 \end{pmatrix}, \|-\vec{g}'_1\| = \begin{pmatrix} z'_1 \\ z'_2 \\ z'_3 \end{pmatrix},$$

then the rotation matrix for the coordinate transformation is obtained through $$T_1 = \begin{pmatrix} x'_1 & y'_1 & z'_1 \\ x'_2 & y'_2 & z'_2 \\ x'_3 & y'_3 & z'_3 \end{pmatrix}^{-1}$$

The control unit 6 is now in a position to correctly process inputs entered by the user on the head 9 such as applying a pulling or pushing force or a torque. For this purpose it receives, in the step S7, the vectorial control parameter $\vec{d}'$ detected by the sensor 12 within the internal coordinate system, in step S8 calculates from this, through application of the coordinate transformation T, a corresponding input $\vec{d} = T_1 \vec{d}'$ within the external coordinate system and then in step S9 actuates a movement in the corresponding direction $\vec{d}$.

If the control parameter $\vec{d}'$ entered by the user is a force, then in step S9 the control unit 6 initiates a translation of the object 1 in the direction of the transformed force $\vec{d}$. If the control parameter $\vec{d}'$ is a torque, then it initiates a rotation of the object 1 around an axis oriented in the direction $\vec{d}$. If the sensor 12 is designed to register force and torque simultaneously, the movement of the object 1 initiated by the control unit 6 can also be a superposition of translation in the direction of the force and rotation around the axis specified by the direction of the torque.

If the movement of the object 1 initiated in step S9 is a pure translation, it has no effect on the coordinate transformation $T_1$. If the movement initiated in step S9 is a rotation, then during the course of the movement the coordinate transformation T is also updated through multiplication by the coordinate transformation R representative of the rotation:

$$T_{n+1} = RT_n,$$

in order to ensure that at any time a control parameter $\vec{d}'$ detected in the internal coordinate system is transformed correctly into the external coordinate system and can be taken into account in the further control of the movement.

Figure 4:
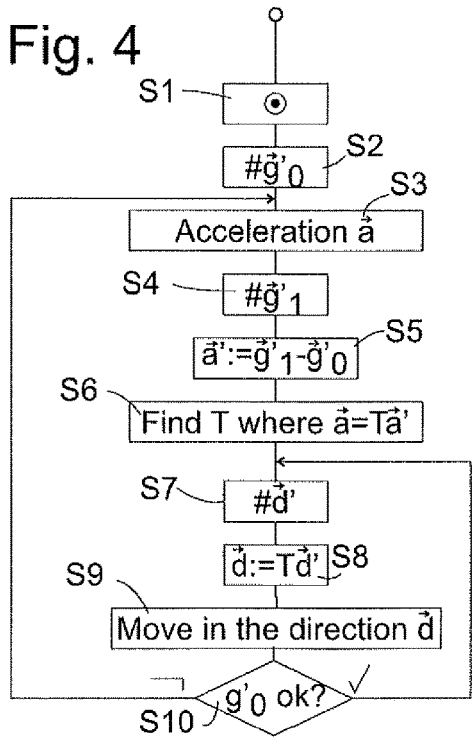
FIG. 4 shows a second embodiment of the method.

FIG. 4 shows an alternative embodiment of the method. The steps S1, S2 are the same as described with reference to FIG. 3 and will not be explained again. The test movement performed in step S3 is in this case not a rotation but a translation. This test movement can fundamentally take place in any direction; however, only the horizontal component is relevant for the subsequent evaluation. The test movement should therefore preferably be oriented orthogonally to the gravitational acceleration, i.e. horizontally. At the beginning of the translation the object 1 undergoes an acceleration, of which at least the direction of the vector $\vec{a}$ thereof in the external coordinate system is known. In order to simplify the notation, it is assumed in this case that the test movement takes place in the direction of the x-axis, that is to say this vector $\vec{a}$ corresponds in direction to the x-axis of the external coordinate system.

During the acceleration phase, the acceleration acting on the sensor 15 is measured again and, in step S4, stored as $\vec{g}'_1$ in the control unit 6. The direction of the acceleration in the internal coordinate system $\vec{a}'$ is calculated in step S5 as the difference between $\vec{g}'_1$ and $\vec{g}'_o$.

If, towards the end of the test movement, the object 1 is subjected to an acceleration $-\vec{a}$ opposite to the direction of the test movement, the then resulting overall acceleration detected by the acceleration sensor 15 can if desired also be measured and stored as $\vec{g}'_2$ in order subsequently to calculate the direction of the acceleration in the internal coordinate system $\vec{a}'$ from the difference $\vec{g}'_1 - \vec{g}'_2$.

With the vectors $\|-\vec{g}'_o\|$ and $\|\vec{a}'\|$, the z- and x-unit vectors of the external coordinate system K in the representation of the internal coordinate system are known. The y-unit vector is derived as $\|-\vec{g}'_1 \times \vec{r}'\|$. The determination of the coordinate transformation T, which transforms the coordinate system K' into the external coordinate system, takes place in the same way as in the method represented in FIG. 3. The steps S7 to S8 are also identical.

The updating of the coordinate transformation T necessary in the case of a rotation of the object 1 can, if numerous rotations are carried out in succession on the object 1, lead to errors, with the consequence that the direction in which the object 1 is moved by the control unit 6 or the axis around which it is rotated no longer corresponds exactly with the direction of the force applied by the user to the input tool 7 or the direction of the applied torque.

In order to avoid such deviations, in the method according to FIG. 3 and FIG. 4, following completion of a movement a step S10 can be provided in which the gravitational acceleration $\vec{g}'_o$ is measured in the internal coordinate system K' and transformed into the external coordinate system K. If the direction of the vector thus obtained differs significantly from the negative z-direction, then the coordinate transformation T is not exact, and the method jumps back to step S3, in order to repeat the test movement and derive the coordinate transformation T once again. If the directions correspond, the method returns directly to step S7 in order to process the next user input.

Errors in the transformation T which only affect the x- and y-components of the transformation result, i.e. a deviation between a purely horizontally oriented vector of the control parameter $\vec{d}'$ and the movement direction $\vec{d}$ derived from this by the control unit 6, remain unnoticed in the step S10 described above.

Figure 5:
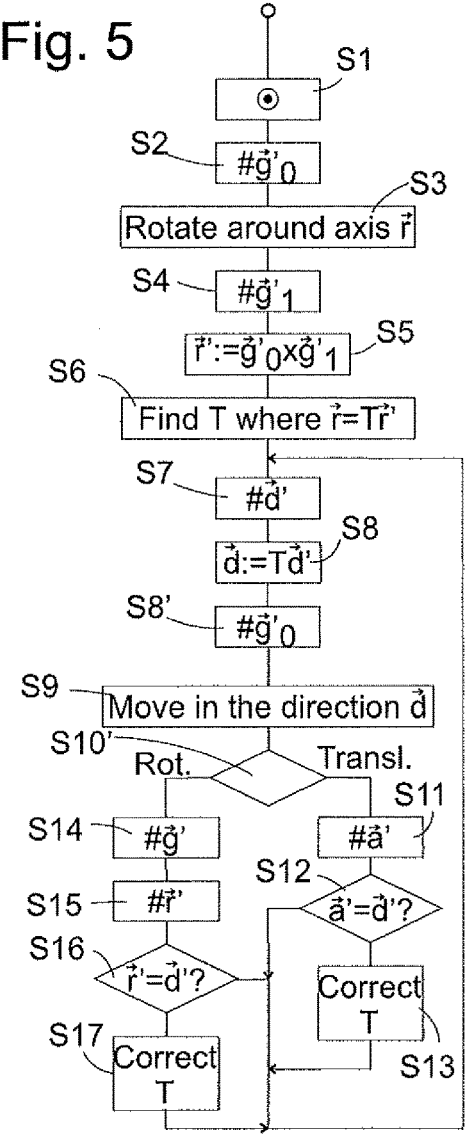
FIG. 5 shows a further development of the method from FIG. 3 or FIG. 4.

Such deviations can be detected and remedied with the method according to FIG. 5. The steps S1 to S9 of this method are the same as in FIG. 3 or 4. In step S10' of the method according to FIG. 5 the control unit checks whether the movement of the object 1 initiated in step S9 is a translation or a rotation.

In the case that the movement is a translation in the direction $\vec{d}$, as described with reference to step S5 of FIG. 4, in step S11 the control unit calculates the acceleration $\vec{a}'$ resulting from this translation, corrected to take into account gravitational acceleration, by forming the difference between an acceleration value measured by the sensor 15 before, and one measured during the movement of step S9, or between an acceleration value measured during an acceleration phase and one measured during a deceleration phase of the movement. The direction of this difference should correspond to the direction of the input $\vec{d}'$ detected by the sensor 12.

If it is established in step S12 that these directions correspond with sufficient accuracy, the method returns directly to step S7 in order to process a further input by the user; in the event of a significant deviation, the coordinate transformation T is corrected in step S13. Such a correction can involve rejecting the previously used transformation T and, based on the direction $\vec{d}$ known in the external coordinate system and the resulting acceleration $\vec{a}'$ in the internal coordinate system measured in step S11, determining an updated coordinate transformation $T^*_{n+1}$, for which $$\frac{\vec{d}}{\|\vec{d}\|} = T^*_{n+1} \frac{\vec{a}'}{\|\vec{a}'\|}$$

applies; however, a weighted total of $T_n$ and $T^*_{n+1}$ can for example also be used as the updated transformation $T^*_{n+1}$. In order to allow $T^*_{n+1}$ to be determined unequivocally, analogously to the procedure described above with reference to step S6, a current measured value for the gravitational acceleration $\vec{g}'_o$ in the internal coordinate system K' should be available; this can for example be measured in a step S8' immediately before the beginning of the movement of the object in step S9.

In a corresponding manner, if the movement in the direction $\vec{d}$ is a rotation, following completion of the rotation the gravitational acceleration vector $\vec{g}'$ is measured again (S14), a resulting orientation of the axis of rotation $\vec{r}'$ in the internal coordinate system is calculated (S15) and the correspondence of its direction to the direction of the input $\vec{d}'$ entered on the input tool 7 is checked (S16) in order to make a correction in step S17 in the event of an excessive deviation.

Optionally, if a significant deviation is determined in step S12 or S16 it can be checked whether an error is present which cannot be remedied through a correction of the coordinate transformation. Such an error occurs, for example, if the input tool 7 has fallen off or been removed from the object 1, if the communication between the input tool 7 and the control unit 6 was interrupted or the input tool 7 has failed. In response to such a detected error the procedure would be discontinued and an error status signal displayed to the user.

It can be checked whether the input tool 7 is attached to the object 1 through a comparison between the acceleration detected by the sensor 15 and the acceleration value for actuation of the end effector 5 resulting from the control command from the control unit 6. For this purpose the control unit 6 determines the deviation between the measured acceleration, corrected to take into account gravitational acceleration, and the acceleration calculated from the control command. If the deviation exceeds a particular threshold value, it can be concluded from this that the input tool 7 is no longer firmly connected with the object 1.

If the input tool 7 was removed from the object 1 or if the input tool 7 has fallen off the object 1, it will no longer move along with the object in the event of a movement of the object 1. Consequently, the sensor 15 of the input tool 7 will not detect any acceleration caused through a movement of the object 1. In other words the values detected by the sensor 15, corrected to take into account gravitational acceleration, assume the value zero and maintain this value, even if the end effector 5 or the object 1 is moved. If the control unit 6 receives from the input tool 7 a measured value, corrected to take into account gravitational acceleration, of zero, and if the end effector 5 or the object 1 is moved at the same time, the control unit 6 can interpret this as an error.

The communication between the input tool 7 and the control unit 6 can be monitored continuously in that the input tool 7 transmits a continuous test signal to the control unit 6. If no test signal is received by the control unit 6, this can be recognised as an interruption in the communication.

A failure of the input tool 7 caused by a defective sensor 15 can be recognised by checking the acceleration signal resulting from the gravitational acceleration g. If the amount of the acceleration vector g or g' deviates from approx. 9.81 (m/s$^2$), or if the direction of the acceleration vector g' detected in the internal coordinate system (while the robot is stationary) differs from a direction which is to be expected on the basis of the gravitational field, then this can be interpreted as a failure of the input tool 7. The test routine can be carried out by the control unit 6.

REFERENCE NUMBERS 1. object
2. robot arm
3. base
4. member
5. end effector
6. control unit
7. input tool
8. base
9. head
10. end face
11. strips of adhesive tape
12. sensor
13. rod
14. sensor component
15. sensor
16. radio interface
17. radio interface
18. accumulator
19. switch
20. button

The invention claimed is:

1. A method for handling an object comprising the steps of:
 a) mechanically connecting the object which is to be handled (1) with a manipulator (5),
 b) mechanically connecting the object which is to be handled (1) with an input tool (7) by means of which a direction ($\vec{d}'$) within an internal coordinate system (K') relating to the input tool (7) is entered in any desired orientation in which the relation between the internal coordinate system (K') and an external coordinate system (K) is unknown;
 c) initiating (S3) a test movement of the manipulator (5) by a control unit (6) on the basis of a direction ($\vec{r}$) known in the external coordinate system (K);
 d) determining (S5), in the internal coordinate system (K'), the direction ($\vec{r}'$) of a movement of the input tool (7) resulting from the test movement of the manipulator (5);
 e) determining (S6; S13), on the basis of the known direction ($\vec{r}$) of the test movement and the direction of the resulting movement ($\vec{r}'$), a coordinate transformation (T) which transforms the direction of the resulting movement ($\vec{r}'$) in the internal coordinate system (K') into the known direction ($\vec{r}$) in the external coordinate system (K);
 f) detecting (S7), within the internal coordinate system (K'), an internal direction ($\vec{d}'$) entered by a user using the input tool (7);
 g) applying (S8) the coordinate transformation (T) to the detected internal direction ($\vec{d}'$) in order to obtain an external direction ($\vec{d}$); and
 h) controlling (S9) a movement of the manipulator (5) on the basis of the external direction ($\vec{d}$).

2. The method according to claim 1, in which the coordinate transformation (T) is updated when the movement of the manipulator (5) initiated in step h) comprises a rotation.

3. The method according to claim 1, in which the test movement is a rotation, and wherein the known direction ($\vec{r}$) is a direction of an axis of the rotation.

4. The method according to claim 1, in which the known direction ($\vec{r}$) is a horizontal direction.

5. The method according to claim 1, characterised in that a direction of a force or of a torque acting between a head (9) and a base (8) of the input tool (7) or, if the head is configured to be moved relative to the base out of a neutral position, the direction of a movement of the head is detected as the entered internal direction ($\vec{d}'$).

6. The method according to claim 1, in which the following steps are carried out between step a) and step b):
 a') detecting (S7) an internal direction ($\vec{d}'$) entered by the user using the input tool;
 a'') applying (S8) a predetermined coordinate transformation ($T_n$) to the internal direction ($\vec{d}'$) in order to obtain the known direction ($\vec{d}$).

7. The method according to claim 6, in which the predetermined coordinate transformation ($T_n$) is a coordinate transformation determined during an earlier iteration of the method.

8. The method according to claim 1, in which a fault is detected when a movement of the input tool (7) is detected which is not caused through a movement of the manipulator (5) or no movement of the input tool (7) is detected in response to a movement of the manipulator (5).

9. An object handling system, comprising:
 an object which is to be handled (1), wherein said object to be handled is mechanically connected with a manipulator (5) and to an input tool (7) by means of which a direction ($\vec{d}'$) within an internal coordinate system (K') relating to the input tool (7) is entered in any desired orientation in which the relation between the internal coordinate system (K') and an external coordinate system (K) is unknown; and
 wherein said object handling system is configured for carrying out the method comprising the steps of:
 a) initiating (S3) a test movement of the manipulator (5) by a control unit (6) on the basis of a direction ($\vec{r}$) known in the external coordinate system (K);
 b) determining (S5), in the internal coordinate system (K'), the direction ($\vec{r}'$) of a movement of the input tool (7) resulting from the test movement of the manipulator (5);
 c) determining (S6; S13), on the basis of the known direction ($\vec{r}$) of the test movement and the direction of the resulting movement ($\vec{r}'$), a coordinate transformation (T) which transforms the direction of the resulting movement ($\vec{r}'$) in the internal coordinate system (K') into the known direction ($\vec{r}$) in the external coordinate system (K);
 d) detecting (S7), within the internal coordinate system (K'), an internal direction ($\vec{d}'$) entered by a user using the input tool (7);
 e) applying (S8) the coordinate transformation (T) to the detected internal direction ($\vec{d}'$) in order to obtain an external direction ($\vec{d}$); and
 f) controlling (S9) a movement of the manipulator (5) on the basis of the external direction ($\vec{d}$).

10. The object handling system according to claim 9, further including an orientation sensor (16), wherein the orientation sensor (16) is an acceleration sensor, and wherein a detection result ($\vec{g}'_o, \vec{g}'_1, \vec{g}'_2$) of the acceleration sensor quantitatively specifies at least the direction of an acceleration acting on the input tool in relation to an internal coordinate system (x', y', z') of the input tool (7).

11. The object handling system according to claim 9, characterised in that the input tool (7) and the control unit (6) are equipped with wireless interfaces (16, 17) for mutual communication.

12. The object handling system according to claim 9, characterised in that the manipulator is an end effector (5) of a robot arm (2) with articulated members (4).

13. The object handling system according to claim 9, further including an input tool, and wherein the input tool includes a switch (19) which responds to the presence of a foreign body in a region of the environment surrounding the input tool.

14. The object handling system according to claim 13, wherein the switch (19) is arranged on the base (8) of the input tool (7) and the region of the surrounding environment is located on a side (10) of the base (8) facing away from the head (9).

15. The object handling system according to claim 13, characterised in that the switch (19) is configured for switching the object handling system between an idle state in which detection results of the orientation sensor (16) and/or of the input sensor (12) are not output and an active state in which the detection results are output.

16. A computer program product with program code which enables a computer to control an object handling system to which an object which is to be handled (1) is mechanically connected with a manipulator (5) and to which the object which is to be handled (1) is mechanically connected with an input tool (7) by means of which a direction ($\vec{d}'$) within an internal coordinate system (K') relating to the input tool (7) is entered in any desired orientation in which the relation between the internal coordinate system (K') and an external coordinate system (K) is unknown, said computer program product with program code enables said computer to control said object handling system to carry out a method comprising the steps of:

a) initiating (S3) a test movement of the manipulator (5) by a control unit (6) on the basis of a direction ($\vec{r}$) known in the external coordinate system (K);

b) determining (S5), in the internal coordinate system (K'), the direction ($\vec{r}'$) of a movement of the input tool (7) resulting from the test movement of the manipulator (5);

c) determining (S6; S13), on the basis of the known direction ($\vec{r}$) of the test movement and the direction of the resulting movement ($\vec{r}'$), a coordinate transformation (T) which transforms the direction of the resulting movement ($\vec{r}'$) in the internal coordinate system (K') into the known direction ($\vec{r}$) in the external coordinate system (K);

d) detecting (S7), within the internal coordinate system (K'), an internal direction ($\vec{d}'$) entered by a user using the input tool (7);

e) applying (S8) the coordinate transformation (T) to the detected internal direction ($\vec{d}'$) in order to obtain an external direction ($\vec{d}$); and f) controlling (S9) a movement of the manipulator (5) on the basis of the external direction ($\vec{d}$).

17. The object handling system according to claim 9, characterised in that the input tool (7) comprises a base (8) for attachment to the object (1) and a head (9) designed to be manipulated by the user and that the head (9) and the base (8) are physically connected via an input sensor (12) which is set up to detect at least one vectorial control parameter ($\vec{d}'$) applied to the head (9) by the user in relation to an internal coordinate system of the input tool.

* * * * *